Nov. 30, 1954 A. M. CREIGHTON, JR 2,695,979

TRANSISTOR UNIT

Filed May 15, 1953

INVENTOR.

Allen M. Creighton, Jr.,

BY

Freeman L. Mueller

Atty.

United States Patent Office 2,695,979

Patented Nov. 30, 1954

2,695,979

TRANSISTOR UNIT

Allen M. Creighton, Jr., Phoenix, Ariz., assignor to Motorola, Inc., Chicago, Ill., a corporation of Illinois Application May 15, 1953, Serial No. 355,360

7 Claims. (Cl. 317—235)

Figures 1, 2:
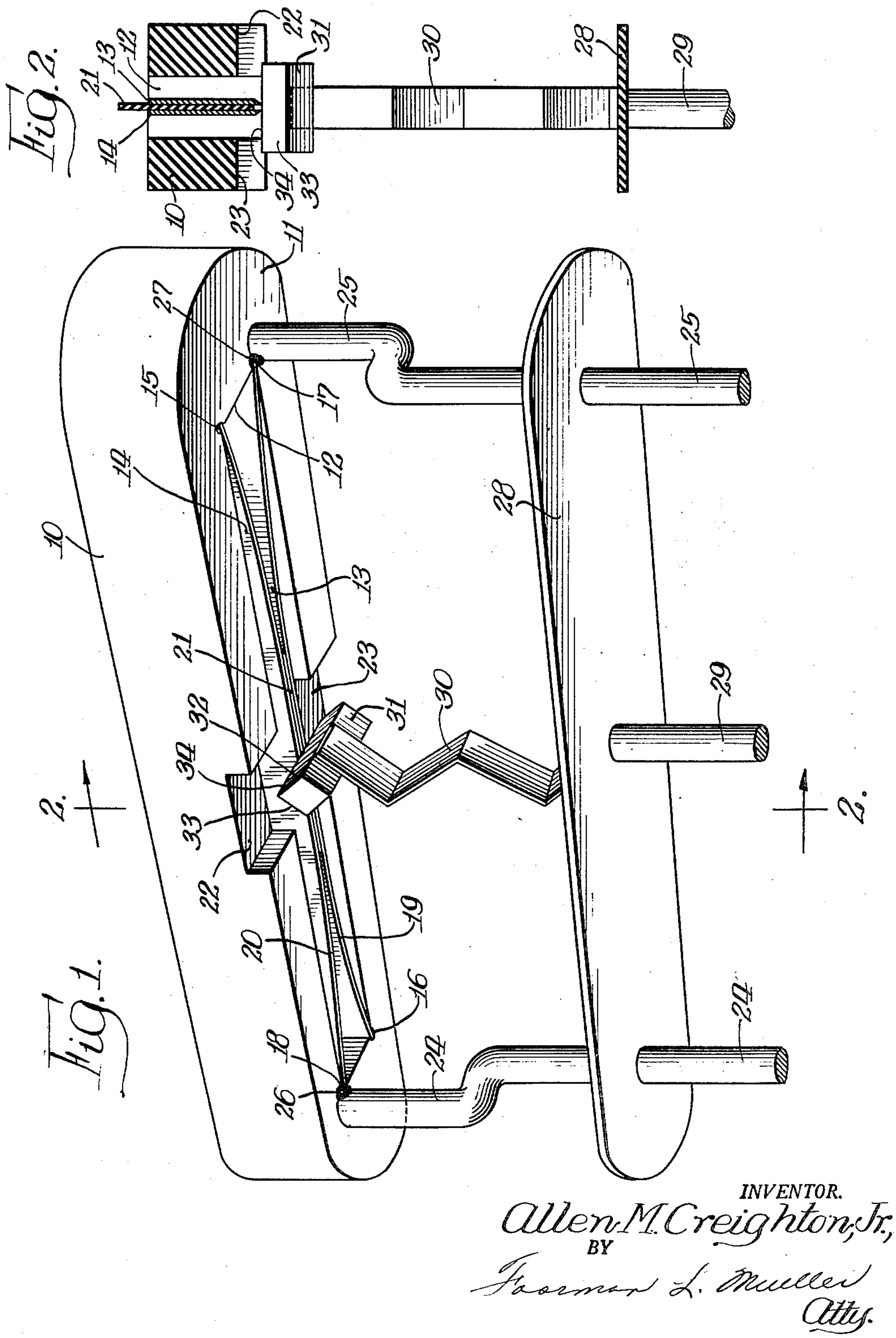

The present invention relates to semi-conductive transistor circuit elements and more particularly to an improved and rugged transistor of the point contact type.

Point contact transistors usually comprise a crystal of semi-conductive material, such as germanium or silicon, that has been treated to exhibit, for example, "N" or negative characteristics when a positive-negative-positive or "P-N-P" point contact transistor is desired. However, point contact transistors of the negative-positive-negative or "N-P-N" type are also known in which the crystal is treated to exhibit "P" or positive characteristics.

The point contact type of transistor usually includes a pair of electrodes known respectively as the emitter and collector, and these electrodes are supported to have spaced pointed extremities in contact with one surface of the crystal. A third element, which is usually in the form of a metal block or tab, is also provided and affixed to another surface of the crystal to constitute the base electrode for the unit.

The emittter and collector electrodes of prior art transistor units usually take the form of a pair of fine wires or thin metallic ribbons supported to extend in spaced parallel relation perpendicular to one face of the crystal. It is to be remembered that the transistor unit is an extremely small device and that the fine wire emitter and collector electrodes are of miscroscopic dimensions and spacing. For example, in a typical known transistor, the fine wire electrodes each have a diameter of the order of .005" and a spacing at their points of about .002", the crystal itself having a cubical dimension of the order of .032" on a side. This renders the manufacture of this type of transistor extremely difficult when prior art practices are followed since it entails critical and minute manual spacing and assembling operations of the fine wire electrodes. In addition, due to the requirements for precise manual mounting and spacing of such electrodes, it is difficult if not impossible to achieve any degree of uniformity between individual ones of a plurality of transistors constructed in this manner. Moreover, the use of fine wires for the collector and emitter electrodes in point contact transistor units usually results in a device that is extremely delicate and which has relatively low mechanical stability.

Another disadvantage of the prior art type of transistors using fine wires or ribbons as the emitter and collector electrodes is the limitation on the power capabilities of such transistor units. This limitation is due to the extremely low heat dissipating capacity of such electrodes which renders them susceptible to damage when any but the smallest currents are passed therethrough. It is usual to electro-form the transistor crystal by passing current pulses from the emitter electrode to the base, and the low heat dissipating capacity of the prior art electrodes, sometimes results in inadequate forming of the transistor crystal due to the limitations on the current that can be passed through the device.

It is an object of the present invention to provide an improved circuit element in the form of a point contact transistor unit that may be manufactured with a minimum of mechanical skill and which is constructed so that uniform characteristics may be attained between individual ones of a quantity of transistor units manufactured in accordance with the invention.

Another object of the invention is to provide such an improved point contact transistor unit that is rugged in its construction and which possesses a high degree of mechanical stability.

Yet another object of the invention is to provide such an improved transistor unit which has relatively high power handling capabilities, and which is capable of handling relatively high surge currents to render it susceptible to adequate electro-forming.

A feature of the invention is the provision of a transistor circuit element which includes a base block having a cavity forming therein with a pair of metallic sheets or plates supported edgewise within the cavity and separated and insulated one from the other, the sheets having knife edges disposed adjacent the mouth of the cavity. With this construction, an edge of a semi-conductive crystal may be supported across the knife edges of the metallic plates so that the latter may constitute emitter and collector electrodes for the unit.

Another feature of the invention is the provision of such an improved unit in which the emitter and collector electrodes are supported in a cavity in the base block as described above, and in which these electrodes have a configuration curving toward the center of the cavity so that the center portions of the plates are in close proximity one with the other and are separated by a thin film of insulating material. A semi-conductive crystal is mounted with an edge extending across the edges of the plates at the center portions and the plates constitute emitter and collector electrodes for the transistor having edges contacting the crystal spaced and insulated one from the other by an extremely small amount.

The above and other features of the invention which are believed to be new are set forth with particularity in the appended claims. The invention itself, however, together with further objects and advantages thereof, may best be understood by reference to the following description when taken in conjunction with the accompanying drawing in which:

Figure 1 shows a transistor unit constructed to embody the teaching of the present invention; and Figure 2 is a sectional view of the unit taken along the lines 2—2 of Figure 1.

The present invention provides a circuit element in the form of a transistor unit which comprises a base block having a cavity extending from a surface thereof. A first electrically conductive member is supported in the cavity and extends across the cavity with an edge extending across the mouth of the cavity adjacent the surface of the block referred to above. A second electrically conductive member is also supported in the cavity adjacent the first member and extends across the cavity with an edge extending across the mouth of the cavity adjacent the surface of the block and spaced laterally from the edge of the first member. The arrangement is such that the electrically conductive members are mutually insulated to constitute electrodes for the transistor unit in a manner to be described.

The transistor of the present invention includes a base block 10 of molded insulating material having a flat surface 11 with an elongated rectangular cavity 12 extending inwardly from that surface. Cavity 12 may extend partially through the base block or, when so desired, may extend from one surface to the other shown in Figure 2.

A pair of electrically conductive members in the form of resilient metallic plates 13 and 14 are supported edgewise in cavity 12 and each has a configuration curving toward the center of the cavity. The plates may be composed, for example, of Phosphor bronze or beryllium copper of No. 4 hardness. The plates 13 and 14 may be supported in the cavity in the illustrated manner by providing small semi-circular openings 15, 16, 17 and 18 at the corners of cavity 12. The plates 13 and 14 are made a little longer than the length of the cavity and are bent inwardly so that each curves toward the center of the cavity with their ends engaging the respective openings 15—18.

The edges 19 and 20 of plates 13 and 14 are each sharpened to a knife edge and extend across the cavity at the mouth thereof and in the plane of surface 11. This construction may be achieved by forcing the plates 13 to 14 into the cavity with the illustrated curved configuration by means of an appropriate tool having a flat surface extending across the cavity and surface 11.

The intermediate portions of plates 13 and 14 normally press together in contact with the other, and in order to separate and insulate the plates, a thin film 21 of insulating material is interposed between these mid-portions. Film 21 may be composed, for example, of mica or a material presently being marketed under the trade-name "Teflon" which may have a thickness, for example, of one mil. A pair of notches 22, 23 is provided in the sides of base block 10 adjacent the intermediate portions of plates 13 and 14.

The unit includes a pair of rigid metallic leads 24 and 25 respectively mounted in base block 10 at diagonally opposite corners of the cavity 12, and which extend outwardly from surface 11 of the base block. The leads 24 and 25 may be suitably mounted in the base block by extending them through the block and fastening them to the block by appropriate eyelets. The leads 24 and 25 are welded or soldered to the end of the respective plates 13 and 14 as shown by the welds 26 and 27. In this manner, electrical connection is made between the leads and the respective metallic plates and the leads also support the plates within the cavity. The leads are separated and supported by means of a molded insulating panel 28 spaced from the surface 11 of block 10.

A third lead 29 extends through panel 28 intermediate leads 24, 25, and an electrically conductive flat resilient spring 30 is welded to lead 29. Spring 30 may be composed, for example, of Phosphor bronze and is soldered at its upper end to a face of a cubical crystal block 31. Crystal 31 has a pair of inclined faces 32, 33 with the line of juncture between these faces forming an edge 34 of the crystal. Resilient spring 30 holds edge 34 of the crystal across knife edges 19 and 20 of plates 13 and 14 at the central portions of the plates and in electrical contact with the latter edges, the crystal being disposed in notches 22 and 23 formed in base block 10. This resilient mounting of the crystal assures adequate and positive electrical contact of its edge 34 with knife edges 19 and 20 of plates 13 and 14 despite slight manufacturing tolerances in the positioning of the latter edges in the plane of surface 11 and block 10. Edges 19 and 20 at the points of contact with the edge 34 of the crystal are spaced by a microscopic amount by film 21 and contact the crystal at spaced points along edge 34 so as to constitute the emitter and collector electrodes for the transistor.

The upper end of resilient spring 30 forms the base electrode for the crystal, and the resilient spring not only biases the crystal against the edges of the metallic plates, but also constitutes a connector thereto from lead 29. It is evident that when so desired, spring 30 may be a rigid metallic lead and leads 24 and 25 may take the form of conductive tension springs to hold the assembly in cavity 12 resiliently against the edge of the crystal.

The assembly of the present invention may be constructed relatively simply since there are no minute and difficult manual operations required. Base block 10 and cavity 15 may be molded to highly accurate dimensions, and plates 13 and 14 may be cut, stamped or punched to the required length within close tolerances. The plates are then assembled within the cavity with the illustrated curving configuration with their center portions in contact one with the other, and the film 21 of insulating material is then inserted therebetween to insulate and separate the plate electrodes the desired minute amount. By use of a suitable tool, the edges 19 and 20 of the plates 13 and 14 may be accurately aligned with the surface 11 of block 10. Thus the electrodes are spaced by the extremely small required amount by the insulating film obviating the need for difficult manual spacing of these electrodes. In this manner, the construction of the transistor is greatly simplified, and units with uniform characteristics can be mass produced.

The resulting assembly is a relatively rugged unit, since the collector and emitter electrodes are in the form of relatively large plates securely supported within the cavity in the base block, and are not fine delicate wires or cat-whiskers. The plates 13 and 14 have appreciable surface area with resulting relatively high heat dissipating capacity. The transistor, therefore, is capable of handling relatively high power, and can withstand sudden current surges without burning out its electrodes. Moreover, the unit is susceptible to adequate electro-forming since there are no severe limitations on the current that can be translated thereby.

In a constructed embodiment of the invention, the following dimensions were used, and these dimensions are listed herein merely by way of example and are not intended to limit the invention in any way:

| | | |
|---|---|---|
| Length of block 10 | inch | 5/8 |
| Width of block 10 | do | 1/4 |
| Depth of block 10 | do | 1/8 |
| Length of cavity 12 | do | 11/32 |
| Width of cavity 12 | do | 1/16 |
| Length of plates 13, 14 (prior to insertion in cavity) | inch | 13/32 |
| Thickness of insulating film 21 | mil | 1 |
| Cubical dimension of crystal 31 | inch | 1/32 x 1/32 x 3/32 |

While a particular embodiment of the invention has been shown and described, modifications may be made and it is intended in the appended claims to cover all such modifications as fall within the true spirit and scope of the invention.

I claim:

1. A circuit element including in combination, a base block having a cavity extending from a surface thereof, a first electrically conductive member supported in said cavity and extending across said cavity with an edge extending across the mouth of said cavity adjacent said surface of said block, and a second electrically conductive member supported in said cavity and extending across said cavity with an edge extending across the mouth of said cavity adjacent said surface and spaced laterally from said edge of said first member, said electrically conductive members being insulated one from the other.

2. A transistor unit including in combination, a base block having a cavity extending from a surface thereof, a first metallic plate supported in said cavity and extending across said cavity with a configuration curving toward the center of said cavity and with an edge extending across the mouth of said cavity adjacent said surface of said block, and a second metallic plate supported in said cavity adjacent said first plate and extending across said cavity with a configuration curving toward the center of said cavity and toward said first plate, said second plate having an edge extending across the mouth of said cavity adjacent said surface of said block and spaced laterally from said edge of said first plate, and said metallic plates being insulated one from the other.

3. A transistor unit including in combination, a base block having at least one flat surface and having a cavity extending from said surface, a first metallic plate supported in said cavity and extending across said cavity with a configuration curving toward the center of said cavity and with an edge extending across the mouth of said cavity in the plane of said surface of said block, and a second metallic plate supported in said cavity adjacent said first plate and extending across said cavity with a configuration curving toward the center of said cavity and toward said first plate, said second plate having an edge extending across the mouth of said cavity in said plane of said surface of said block and spaced laterally from said edge of said first plate, said plates being insulated one from the other, and said base block having a pair of notches formed in said flat surface thereof adjacent said cavity with an axis traversing substantially the center points of said edges of said metallic plates.

4. A transistor unit including in combination, a base block having a rectangular cavity extending from a surface thereof, a first metallic plate supported in said cavity and extending from one corner on one side of said cavity to the opposite corner on said one side of said cavity with a configuration curving toward the center of said cavity and with an edge extending across the mouth of said cavity adjacent said surface of said block, and a second metallic plate supported in said cavity and extending from one corner on the other side of said cavity to the opposite corner on said other side of said cavity with a configuration curving toward the center of said cavity and with an edge extending across the mouth of said cavity adjacent said surface of said block and spaced laterally from said edge of said first plate, and said plates being insulated one from the other.

5. A transistor unit including in combination, a base block of molded insulating material, having a rectangular cavity extending from a surface thereof, a first metallic plate supported in said cavity and extending from one corner on one side of said cavity to the opposite corner on said one side of said cavity with a configuration curving toward the center of said cavity and with an edge extending across the mouth of said cavity adjacent said surface of said block, a film of insulating material disposed across the surface of the central portion of said metallic plate facing the center of said cavity, and a second metallic plate supported in said cavity and extending from one corner on the other side of said cavity to the opposite corner on said other side of said cavity with a configuration curving toward the center of said cavity with the central portion of said second metallic plate engaging said film of insulating material and separated thereby from said central portion of said first metallic plate, and said second metallic plate having an edge extending across the mouth of said cavity adjacent said surface of said block and spaced laterally from said edge of said first plate at the central portions of said plates by said insulating film.

6. A transistor unit including in combination, a base block of molded insulating material having a rectangular cavity extending from a surface thereof, a first metallic plate supported in said cavity and extending from one corner on one side of said cavity to the opposite corner on said one side of said cavity with a configuration curving toward the center of said cavity and with a knife edge extending across the mouth of said cavity adjacent said surface of said block, a film of insulating material disposed across the surface of the central portion of said metallic plate facing the center of said cavity, a second metallic plate supported in said cavity and extending from one corner on the other side of said cavity to the opposite corner on said other side of said cavity with a configuration curving toward the center of said cavity with the central portion of said second metallic plate engaging said film of insulating material and separated thereby from said central portion of said first metallic plate, said second metallic plate having a knife edge extending across the mouth of said cavity adjacent said surface of said block and spaced laterally from said edge of said first plate at the central portions of said plates by said insulating film, and a pair of metallic leads mounted on said base block respectively adjacent two diagonally opposite corners of said cavity and connected to the respective ones of said metallic plates.

7. A transistor unit including in combination, a base block of molded insulating material having at least one flat surface and an elongated rectangular cavity extending inwardly from said surface, a first resilient metallic plate supported in said cavity and extending from one corner on one side of said cavity to the opposite corner on said one side of said cavity with a configuration curving toward the center of said cavity and with a knife edge extending across the mouth of said cavity in the plane of said surface of said block, a film of insulating material disposed across the surface of the central portion of said metallic plate facing the center of said cavity, a second metallic plate supported in said cavity and extending from one corner on the other side of said cavity to the opposite corner on said other side of said cavity with a configuration curving toward the center of said cavity with the central portion of said second metallic plate engaging said film of insulating material and separated thereby from said central portion of said first metallic plate, said second metallic plate having a knife edge extending across the mouth of said cavity in the plane of said surface of said block and spaced laterally from said knife edge of said first plate at the central portions of said plates by said insulating film, said surface of said base having a notch formed therein on each side of said cavity adjacent said central portions of said plates, and a pair of rigid metallic supporting leads mounted on said base block respectively adjacent two diagonally opposite corners of said cavity and connected to the respective ones of said metallic plates, said leads extending perpendicularly outwardly from said surface of said base block.

No references cited.